(12) United States Patent
Chen et al.

(10) Patent No.: US 11,364,620 B2
(45) Date of Patent: Jun. 21, 2022

(54) RAIL-MOUNTED INTELLIGENT INSPECTION ROBOT

(71) Applicant: HANGZHOU SHENHAO TECHNOLOGY CO., LTD., Zhejiang (CN)

(72) Inventors: Rushen Chen, Zhejiang (CN); Yongyue Li, Zhejiang (CN); Shaohua Tian, Zhejiang (CN); Fuliang Luo, Zhejiang (CN); Wangfeng Chen, Zhejiang (CN)

(73) Assignee: HANGZHOU SHENHAO TECHNOLOGY CO., LTD., Hangzhou (CN)

( * ) Notice: Subject to any disclaimer, the term of this patent is extended or adjusted under 35 U.S.C. 154(b) by 210 days.

(21) Appl. No.: 16/629,556

(22) PCT Filed: May 14, 2018

(86) PCT No.: PCT/CN2018/086690
§ 371 (c)(1),
(2) Date: Jan. 8, 2020

(87) PCT Pub. No.: WO2019/134326
PCT Pub. Date: Jul. 11, 2019

(65) Prior Publication Data
US 2021/0031359 A1    Feb. 4, 2021

(30) Foreign Application Priority Data

Jan. 4, 2018  (CN) .......................... 201810006461.8

(51) Int. Cl.
*B25J 5/02*    (2006.01)
*B25J 19/02*   (2006.01)
*B25J 5/00*    (2006.01)
*B25J 9/16*    (2006.01)

(52) U.S. Cl.
CPC ............... *B25J 5/02* (2013.01); *B25J 19/023* (2013.01); *B25J 5/007* (2013.01); *B25J 9/1694* (2013.01); *B25J 19/021* (2013.01)

(58) Field of Classification Search
CPC ... B25J 5/02; B25J 5/007; B25J 9/1694; B25J 19/021; B25J 19/023
See application file for complete search history.

(56) References Cited

U.S. PATENT DOCUMENTS

2004/0042889 A1*  3/2004  Sanders ................ B66C 23/027
                                                414/744.6

* cited by examiner

*Primary Examiner* — Jermie E Cozart

(57) ABSTRACT

A rail-mounted intelligent inspection robot includes a robot body and a guide rail, the robot body being hung on the guide rail and moving along the guide rail. One side of the guide rail facing the robot body is affixed with a plurality of barcodes, and the translation mechanism is provided with a barcode reader. A control module and a translation motor are disposed within the control platform. The lifting mechanism is connected to the control platform and the detection platform, and an intelligent holder is disposed below the detection platform. The rail-mounted inspection robot of the present invention may perform continuous inspection operations, and may meet the 7*24 hours of uninterrupted work through the power supply of the sliding contact wire. The recognized dial data is more accurate, and the read information may be transmitted to the background and processed in time.

5 Claims, 7 Drawing Sheets

RAIL-MOUNTED INTELLIGENT INSPECTION ROBOT

BACKGROUND OF THE INVENTION

Field of the Invention

The present invention relates to the field of substation inspection robots, in particular to a rail-mounted intelligent inspection robot.

Description of Related Art

Rail-mounted inspection robot is a monitoring robot system specially used in various indoor rooms of a substation, which can serve as a replacement for various manual inspections, detection, monitoring, fault diagnosis, and early warning functions. Through a self-running mobile platform and by equipping with a set of high-performance testing instruments, a number of fixed sensors and instruments required for "intelligent substations" can be greatly reduced, without extensive wiring and retrofitting existing switch rooms, GIS rooms and relay rooms, so as to improve the advanced operation level while lowering the overall operating cost.

Rail-mounted intelligent inspection robot integrates the latest mechatronics and information technology, employs autonomous or remote control methods for serving partially as a replacement for manual detections in visible light, infrared, partial discharge, sound in switch rooms, GIS rooms and relay rooms, and compares and analyzes the inspection data to timely discovers the hidden dangers and failure precursors during the operation of the switchgear, so that the digitization of the switch rooms, GIS rooms and relay rooms and the automation level of all-round monitoring are improved, the safe and reliable operation of equipment is ensured, the management level of high-voltage intelligent inspection is enhanced, and the controllability of the inspection process is increased, thereby laying a foundation for promoting the development of intelligent detection technology in the whole society.

Further, the positioning accuracy is an important means to improve the inspection recognition rate of the rail-mounted intelligent inspection robot, and is also the first and key problem to be solved by the indoor rail-mounted intelligent inspection robot.

SUMMARY OF THE INVENTION

The object of the present invention is to provide a rail-mounted intelligent inspection robot, which has accurate positioning, high detection efficiency, and may complete normal inspection operations in the substation as well as providing real-time data analysis and decision support.

The technical solution of the present invention is provided below. A rail-mounted intelligent inspection robot includes a robot body and a guide rail, the robot body being hung on the guide rail and moving along the guide rail. The robot body is provided with a translation mechanism, a control platform, a lifting mechanism, a detection platform, and an intelligent holder. The translation mechanism is a semi-enclosed structure and is mounted on the guide rail, one side of the guide rail facing the robot body is affixed with a plurality of barcodes, and the translation mechanism is provided with a barcode reader that is opposite to the barcodes. The control platform is mounted below the translation mechanism, a control module and a translation motor that drives the robot body to move along the guide rail are disposed within the control platform, and the control module controls the translation motor to operate according to barcode information read by the barcode reader.

The lifting mechanism connects the control platform with the detection platform. The lifting mechanism includes a lifting rope, a cylinder and a lifting motor that drives the cylinder to rotate, wherein the lifting rope has one end wound on the cylinder, and one other end connected to the detection platform, and the lifting rope being sleeved outside with a telescopic joint. The intelligent holder is mounted below the detection platform, and the intelligent holder rotates 360 degrees horizontally relative to the detection platform.

In one embodiment, roller wheels are disposed on an internal top surface of the translation mechanism, and auxiliary wheels are disposed on a side surface of the translation mechanism, wherein the roller wheels abut an upper surface of the guide rail, and the auxiliary wheels abut a side surface of the guide rail. A sliding contact wire that connects a power supply is disposed on the guide rail, and an electric contact that is electrically connected to the sliding contact wire is disposed within the translation mechanism.

In one embodiment, the intelligent holder includes a body, an infrared camera module and a visible light camera module that are disposed on both sides of the body, and an insulation measurement module at a bottom of the body, wherein the infrared camera module and the visible light camera module on both sides rotate 90 degrees up and down relative to the body.

In one embodiment, an infrared camera and a pickup unit are disposed on the infrared camera module, and a visible light camera and a fill light are disposed on the visible light camera module. The insulation measurement module includes an insulation measurement probe, wherein a ground electric wave sensor and an ultrasonic sensor are disposed on the insulation measurement probe.

In one embodiment, the lifting mechanism further includes a synchronous pulley connected to the lifting motor, a ball spline shaft and a ball spline sleeve that are matched with each other, a trapezoidal screw and a trapezoidal nut. The synchronous pulley is connected to the lifting motor through a conveyor belt, the synchronous pulley is mounted on the ball spline shaft, and the roller wheels are mounted outside the ball spline sleeve matched with the ball spline shaft. The trapezoidal screw has one end fixedly mounted on the roller wheels, and one other end rotatably cooperated with the trapezoidal nut; and the control module in the control platform controls the lifting motor to operate.

In the present invention, the robot body moves along guide rail, and the barcodes disposed on the guide rail function as positioning. When the barcode information corresponding to all measuring points are entered into the control module in advance, the barcode reader on the robot body reads the position information on the barcodes during the movement and compares the read position information with a position of the previously entered measurement point, thereby controlling the translation motor to rotate forward or reverse for adjusting the robot body left and right to reach the measurement point.

In the present invention, a light beam emitted by the barcode reader scans 3 to 4 barcodes at the same time, and an absolute distance between each barcode is 3 cm, so as to achieve an extremely high measurement accuracy as compared with the rotary encoder, with a positioning accuracy up to ±1 mm, so that it may be applied to the absolute positioning of curves and slopes. The barcode strips may be separated, and the barcode strips may be mounted only where measurement is required. It is safe and reliable, reading 3 barcodes each time to calculate the actual distance value. The highest speed measurement speed is 4 m/s, and the maximum measurement distance is 10000 meters, and the barcode strip made of special material comes with very strong and highly elastic self-adhesive strip and has strong corrosion resistance as well as resisting ultraviolet rays, chemical solvents and industrial cleaning agents.

In the present invention, the lifting of the intelligent holder is controlled by using two steel ropes. The lifting motor transmits power to the synchronous pulley and the ball spline shaft through a synchronous belt. The matched ball spline sleeve drives the cylinder to rotate forward and backward, and the rope drives the lower weight of the lower end to move through the cylinder's forward and reverse rotation. Further, in order to prevent the rope from overlapping during the winding process, the trapezoidal screw on the right side of the cylinder is always screwed with the trapezoidal nut fixed on the bracket, so that the trapezoidal screw is screwed to drive the cylinder to move left and right while the cylinder is rotating, wherein the distance of the movement of each turn is equal to the diameter of the rope, thereby avoiding overlapping or friction between the rope and realizing the function of automatic wiring. In this way, the length of each turn of the rope on the cylinder is ensured to be consistent, and the stroke of the rope may be ensured to be consistent after each rotation of the motor. The ratio of the diameters of the cylinder to the wire is more than 25, which further improves the service life of the rope (the number of fatigue tests exceeds 200000 times). In order to improve the maintenance-free period, an oil storage space is added inside the trapezoidal nut and the cylinder for being filled with solid lubricants during assembly, so that the ball spline shaft and the ball spline sleeve, the trapezoidal nut and the trapezoidal screw are fully lubricated during operation, and the maintenance-free period may be achieved ≤1 time/year.

The instrument position at each measuring point is recorded in the control module in advance, that is, recording a distance that the intelligent holder needs to descend to the measuring point. The control module reads the position information on the barcodes read by the barcode reader, compares the read position information with the position of the measurement point input in advance, and controls the number of rotations of the lifting motor according to the distance required to descend, thereby causing the intelligent holder to reach the instrument position. For the intelligent holder, the rotation angle is controlled by an external computer, and the instrument is photographed by an infrared camera or a visible light camera to send the photo to the computer for data reading and analysis as well as recording the instrument value. Meanwhile, the ground wave sensor and ultrasonic sensor may be used to measure the insulation degradation of equipment, and the pickup unit is used to record the noise in the equipment for subsequent analysis such as failure and aging.

The rail-mounted inspection robot of the present invention may perform continuous inspection operations, and may meet the 7*24 hours of uninterrupted work through the power supply of the sliding contact line. The recognized dial data is more accurate, and there will be no false readings due to sensory errors. It is not affected by environmental factors and may perform inspection operations during the day or at night. The read information may be transmitted to the background and processed in time, and any relevant faults may be found in time, so that the relevant personnel may be notified for processing.

BRIEF DESCRIPTION OF THE DRAWINGS

Aspects of the present invention are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

LIST OF SERIAL NUMBERS IN THE FIGURES

Figure 1:
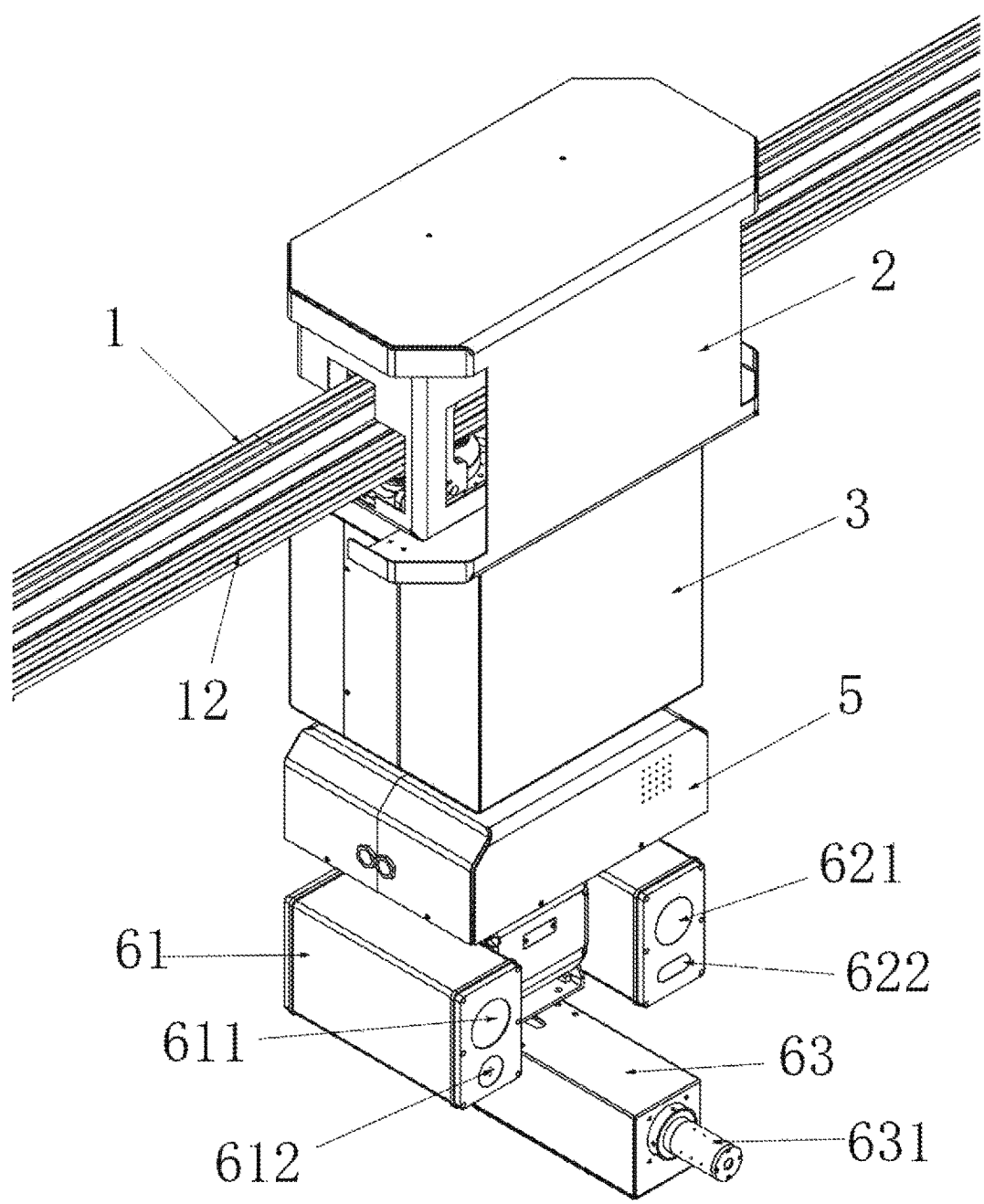
FIG. 1, FIG. 2, and FIG. 3 are structural diagrams of a rail-mounted intelligent inspection robot according to the present invention.
Figure 2:
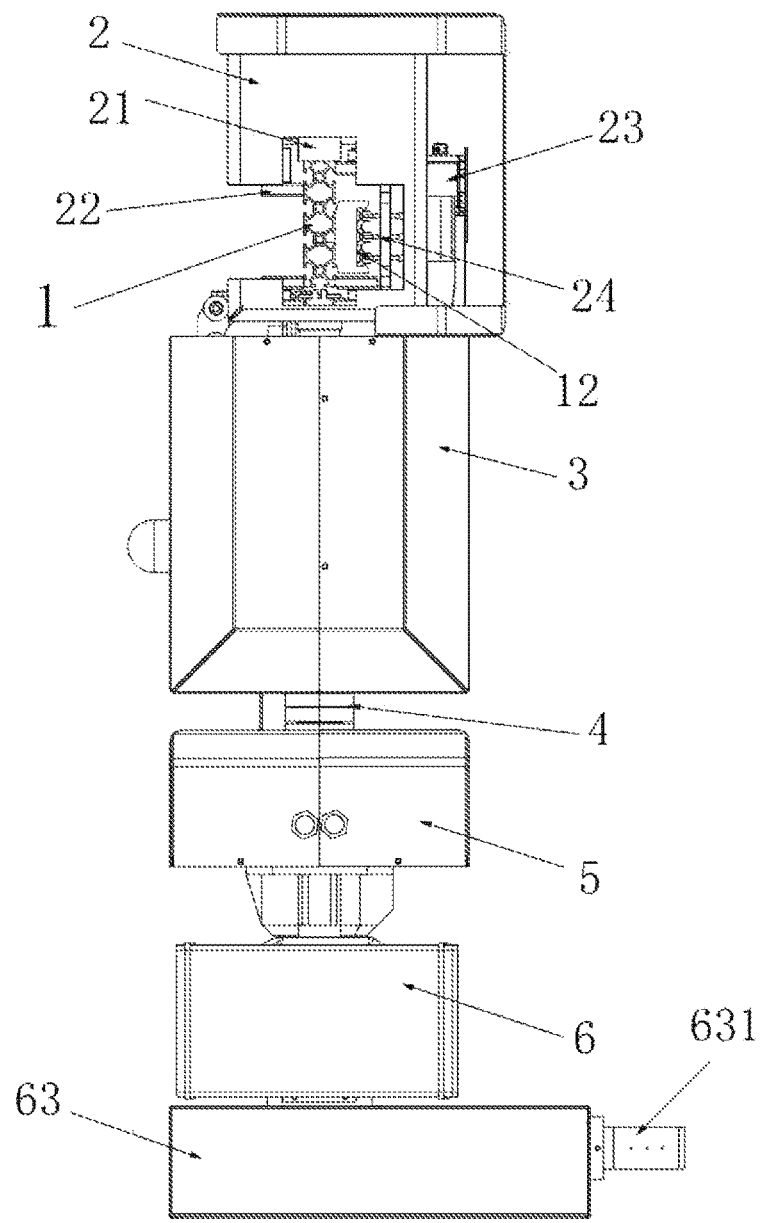
Figure 3:
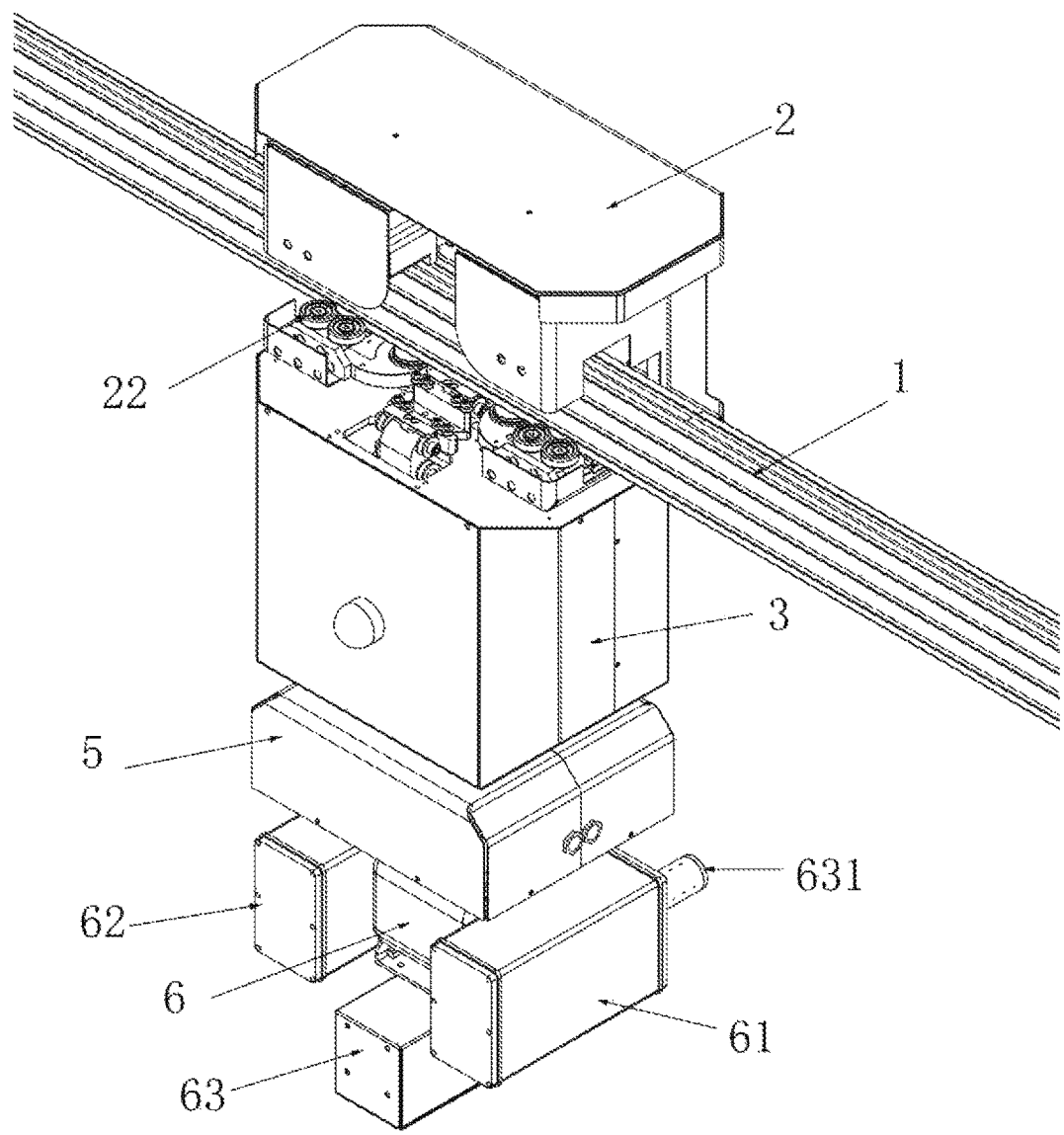
Figure 4:
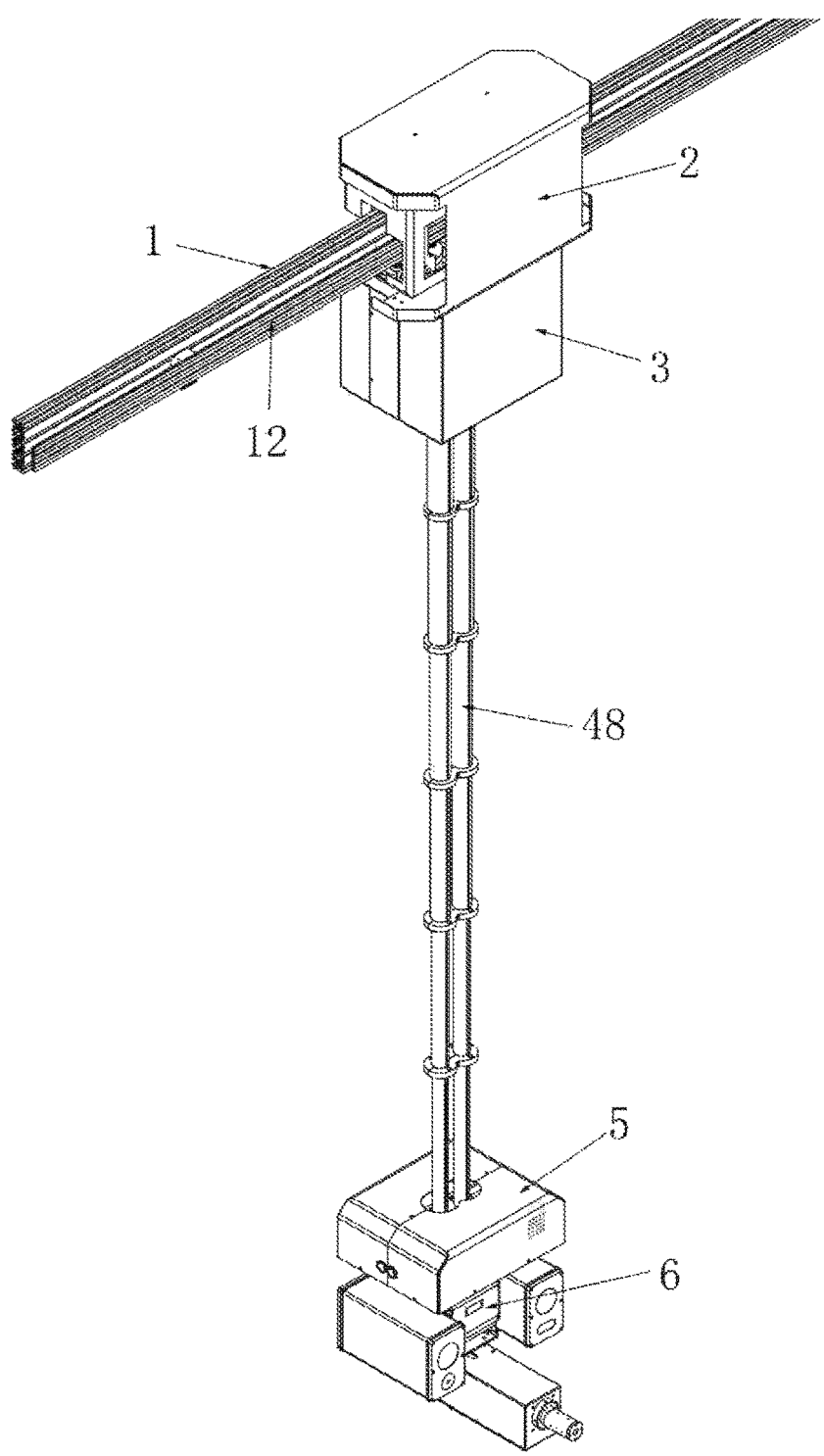
FIG. 4 is a working diagram of a rail-mounted intelligent inspection robot according to the present invention.
Figure 5:
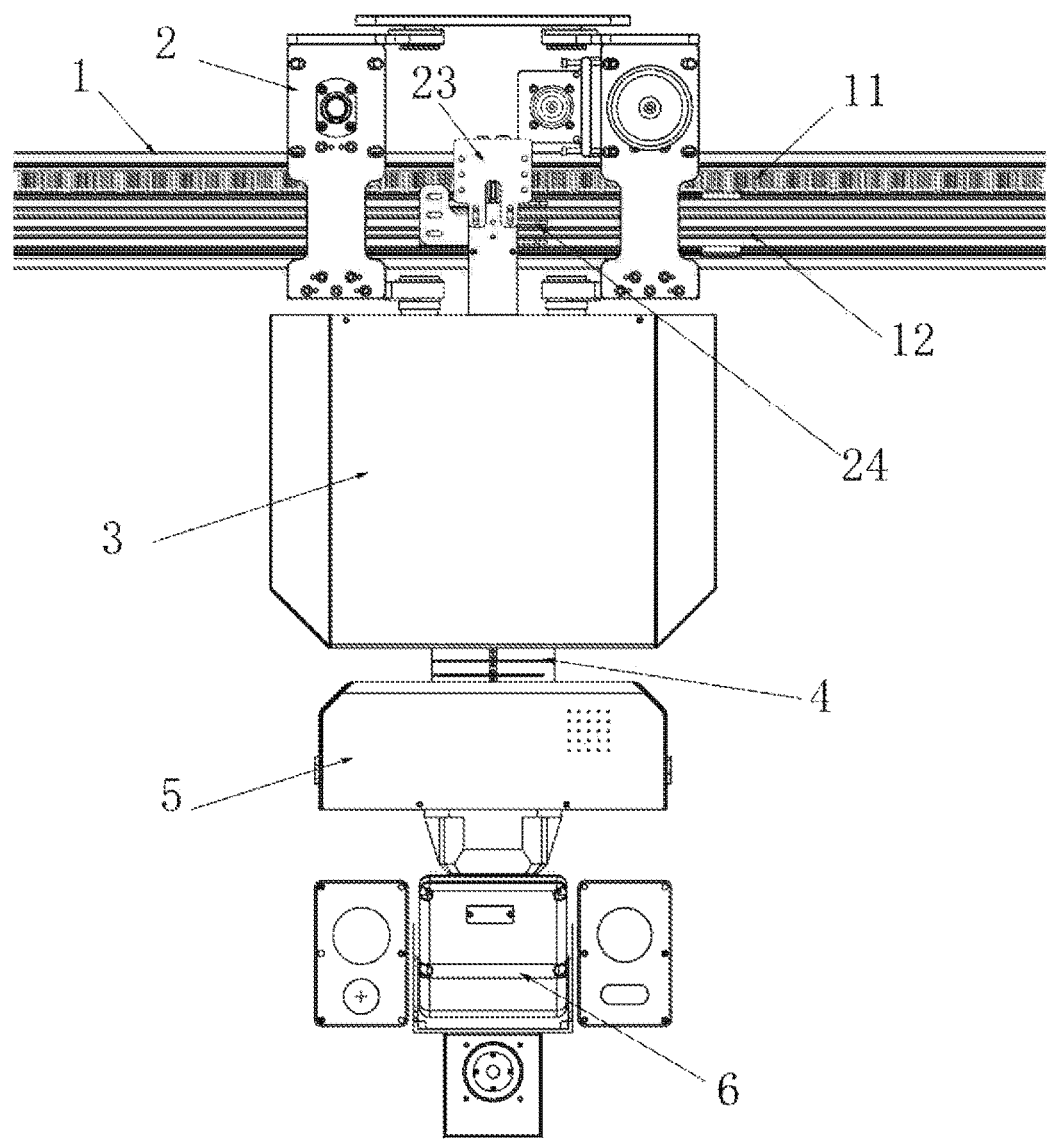
FIG. 5 is a positioning diagram of a rail-mounted intelligent inspection robot according to the present invention (with the cover of a translation mechanism removed).
Figure 6:
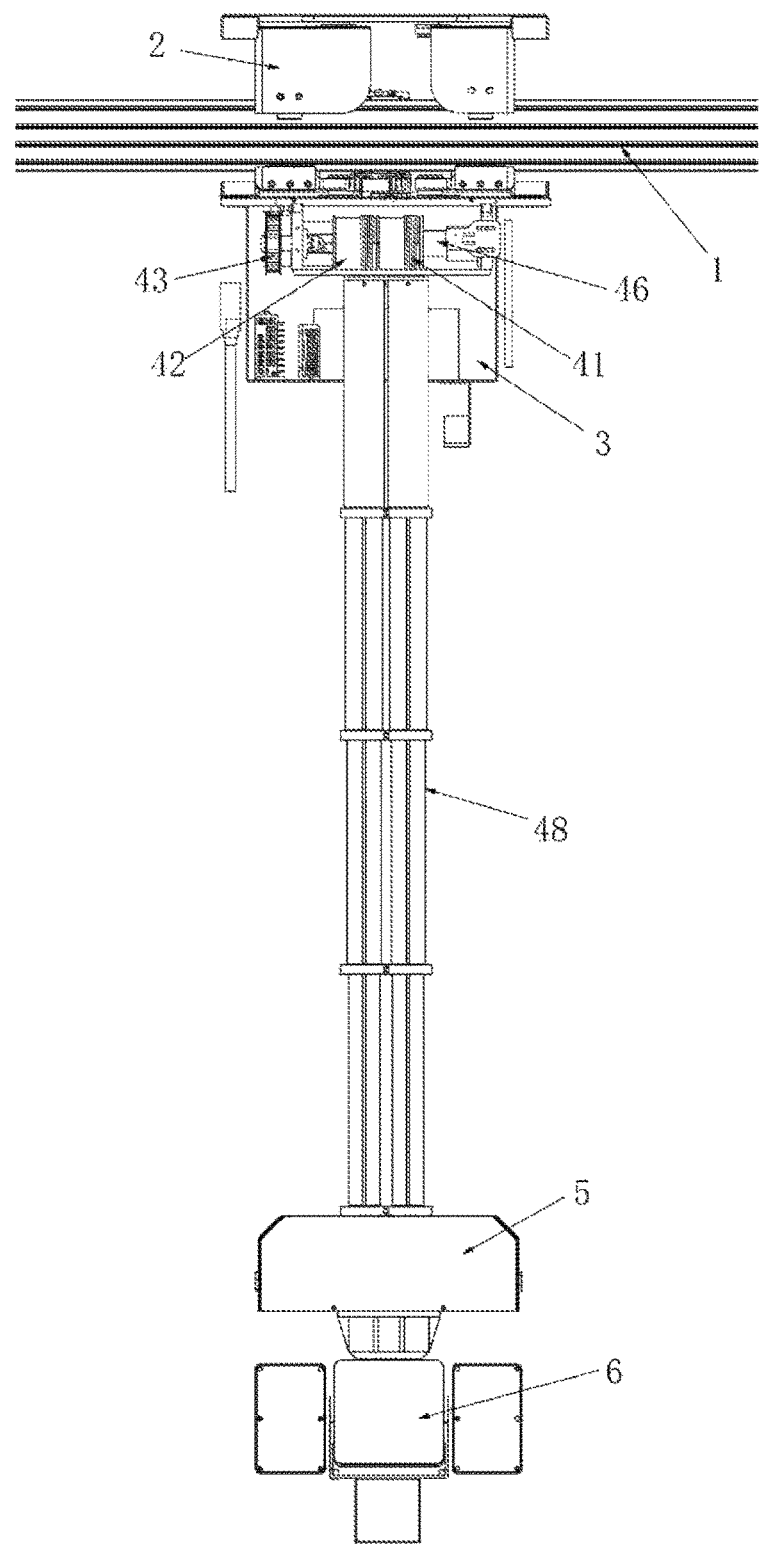
FIG. 6 is a structural diagram of a lifting mechanism according to the present invention (with the cover of a control platform removed).
Figure 7:
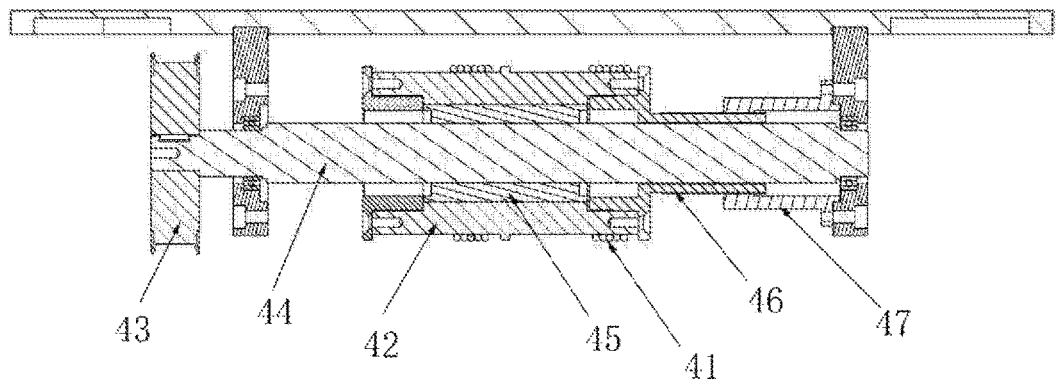
FIG. 7 is a sectional view of a lifting mechanism according to the present invention.

1 Guide rail
11 Barcode
12 Sliding contact wire
2 Translation mechanism
21 Roller wheel
22 Auxiliary wheel
23 Barcode reader
24 Electric contact
3 Control platform
4 Lifting mechanism
41 Lifting rope
42 Cylinder
43 Synchronous pulley
44 Ball spline shaft
45 Ball spline sleeve
46 Trapezoidal screw
47 Trapezoidal nut
48 Telescopic joint
5 Detection platform
6 Intelligent holder
61 Infrared camera module
611 Infrared camera
612 Pickup unit
62 Visible light camera module
621 Visible light camera
622 Fill light
63 Insulation measurement module
631 Insulation measurement probe

DESCRIPTION OF THE INVENTION

The following invention provides many different embodiments, or examples, for implementing different features of the provided subject matter. Specific examples of components and arrangements are described below to simplify the present invention. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present invention may repeat reference numerals and/or letters in the various examples. This repetition is for the purpose of simplicity and clarity and does not in itself dictate a relationship between the various embodiments and/or configurations discussed.

The technical solution in the embodiments of the present invention will be clearly and completely described hereafter in connection with drawings of specific embodiments of the present invention.

Please refer to the figures. The rail-mounted intelligent inspection robot of this embodiment includes a robot body and a guide rail 1, the robot body being hung on the guide rail 1 and moving along the guide rail 1. The robot body is provided with a translation mechanism 2, a control platform 3, a lifting mechanism 4, a detection platform 5, and an intelligent holder 6.

The translation mechanism 2 has a semi-enclosed housing and is mounted on the guide rail 1. Two roller wheels 21 (i.e., a driving wheel and a driven wheel) are disposed on an internal top surface of the housing of the translation mechanism 2, and auxiliary wheels 22 are disposed on a side surface of the housing of the translation mechanism 2, wherein the two roller wheels 21 abut an upper surface of the guide rail 1, the auxiliary wheels 22 abut a side surface of the guide rail 1, which is equivalent to enclosing the guide rail 1 in the housing, and the driving wheel is mounted coaxially with a pulley that is driven by the translation motor. One side of the guide rail 1 facing the robot body is affixed with a plurality of barcodes 11, and the translation mechanism 2 is provided with a barcode reader 23 that is opposite to the barcodes 11. A sliding contact wire 12 that is below the barcodes 11 and connects a power supply is disposed on the guide rail 1, and an electric contact 24 that is electrically connected to the sliding contact wire 12 is disposed within the translation mechanism 2, so that the rail-mounted robot may perform continuous inspection operations, and may meet the 7*24 hours of uninterrupted work through the power supply of the sliding contact wire 12.

The control platform 3 is mounted below the translation mechanism 2, a control module and a translation motor that drives the robot body to move along the guide rail 1 are disposed within the control platform 3, and the control module controls the translation motor to operate according to barcode information read by the barcode reader 23. When the barcode information corresponding to all measuring points are entered into the control module in advance, the barcode reader 23 on the robot body, reads the position information on the barcodes 11 during the movement and compares the read position information with a position of the previously entered measurement point, thereby controlling the translation motor to rotate forward or reverse for adjusting the robot body left and right to reach the measurement point.

The lifting mechanism 4 connects the control platform 3 with the detection platform 5, and the lifting mechanism 4 includes a drive assembly and lifting ropes 41. The drive assembly is located in the control platform 3 and includes a cylinder 42, a lifting motor that drives the cylinder 42 to rotate, a synchronous pulley 43 connected to the lifting motor, a ball spline shaft 44 and a ball spline sleeve 45 that are matched with each other, a trapezoidal screw 46 and a trapezoidal nut 47. The lifting ropes 41 have two ropes with one end wound around the cylinder 42 and the other end connected to the detection platform 5. The lifting rope 41 is sleeved outside with a telescopic joint 48 to protect the lifting rope 41, which ensures that the lifting rope 41 does not shake during operation. The synchronous pulley 43 is connected to the lifting motor through a conveyor belt, the synchronous pulley 43 is mounted on a ball spline shaft 44, and the cylinder 42 is mounted outside the ball spline sleeve 45 matched with the ball spline shaft 44. The trapezoidal screw 46 has one end fixedly mounted on the cylinder 42, and the other end rotatably cooperated with the trapezoidal nut 47. The control module in the control platform 3 controls the lifting motor to operate.

When the lifting assembly is installed, the lifting rope 41 is first fixed into the hole on the surface of the cylinder 42, and then the ball spline sleeve 45 is mounted into the cylinder 42 to ensure the simultaneous rotation by the flat key. Appropriate grease is filled with the cylinder 42, and is sealed with an oil cap. The trapezoidal screw 46 on the right side is mounted to the side surface of the cylinder 42 with a bolt to ensure that both will rotate at the same time. The trapezoidal nut 47 and a bearing are mounted on a right bracket, and a bearing is mounted on a left bracket. The ball spline shaft 44 is mounted to the bearings of the brackets, the synchronous pulley 43 is mounted on the left side of the ball spline shaft 44 to be connected to the synchronous pulley 43 on the lifting motor, so that the lifting rope 41 is wound on the cylinder 42 when the lifting motor is rotating forward, and the lifting rope 41 is released when the motor is rotating backward. The lifting rope 41 has a diameter of 3 mm, the cylinder 42 has a diameter of 70 mm, and the trapezoidal screw 46 and the trapezoidal nut 47 are Tr36×3. A translation distance of the cylinder 42 is equal to the wire diameter of the lifting rope 41.

The intelligent holder 6 is mounted below the detection platform 5, and the intelligent holder 6 may rotate 360 degrees horizontally relative to the detection platform 5. The intelligent holder 6 includes a body, an infrared camera module 61 and a visible light camera module 62 that are disposed on both sides of the body, and an insulation measurement module 63 at a bottom of the body, wherein the infrared camera module 61 and the visible light camera module 62 on both sides may rotate 90 degrees up and down relative to the body. An infrared camera 611 and a pickup unit 612 are disposed on the infrared camera module 6, and a visible light camera 621 and a fill light 622 are disposed on the visible light camera module 62. The insulation measurement module 63 includes an insulation measurement probe 631, and a ground electric wave sensor and an ultrasonic sensor are disposed on the insulation measurement probe 631.

The guide rail 1 is reasonably arranged according to the terrain of the substation and the placement of the equipment, and the barcode 11 and the sliding contact wire 12 are arranged on the guide rail 1. The barcode information corresponding to all measurement points and the distance information of the intelligent holder 6 that the measurement point needs to descent are input into the control module in advance. During the robot is in operation, the barcode reader 23 sends position information on the read barcode to the control module, and the control module compares the read position information with the pre-stored measurement point position. When the read position value is less than the pre-stored measurement point position value, the control module controls the translation motor to rotate forward and translate the robot body rightward to reach the measurement point. When the read position value is greater than the measurement point position value, the control module controls the translation motor to rotate backward and translate the robot body leftward to reach the measurement point.

When the robot body reaches the measurement point, the control module controls the rotation of the lifting motor according to the pre-stored information of the distance that the intelligent holder 6 needs to descend, and controls the number of rotations of the lifting motor according to the distance that has to descend, thereby causing the intelligent holder 6 to reach the instrument position. Further, the horizontal rotation angle of the intelligent holder 6 and the angle at which the Infrared camera module 61 and the visible light camera module 62 rotate up and down are controlled by an external computer. Finally the instrument is photographed by an infrared camera 611 or a visible light camera 621 to send the photo to the computer for data reading and analysis as well as recording the instrument value. Meanwhile, the ground wave sensor and ultrasonic sensor may be used to measure the insulation degradation of equipment, and the pickup unit is used to record the noise in the equipment for subsequent analysis such as failure and aging. When the instrument at the measurement point is photographed, the control module drives the lifting motor to draw the intelligent holder 6 back to the original position, and then the translation motor drives the whole robot to translate to the next measurement point for detection operations.

What is claimed is:

1. A rail-mounted intelligent inspection robot, comprising:
a robot body and a guide rail, the robot body being hung on the guide rail and moving along the guide rail;
wherein the robot body is provided with a translation mechanism, a control platform, a lifting mechanism, a detection platform, and an intelligent holder; the translation mechanism is a semi-enclosed structure and is mounted on the guide rail, one side of the guide rail facing the robot body is affixed with a plurality of barcodes, and the translation mechanism is provided with a barcode reader that is opposite to the barcodes; the control platform is mounted below the translation mechanism, a control module and a translation motor that drives the robot body to move along the guide rail are disposed within the control platform, and the control module controls the translation motor to operate according to barcode information read by the barcode reader;
the lifting mechanism connects the control platform with the detection platform, the lifting mechanism comprising a lifting rope, a cylinder and a lifting motor that drives the cylinder to rotate, wherein the lifting rope has one end wound on the cylinder, and one other end connected to the detection platform, the lifting rope being sleeved outside with a telescopic joint; the intelligent holder is mounted below the detection platform, and the intelligent holder rotates 360 degrees horizontally relative to the detection platform.

2. The rail-mounted intelligent inspection robot according to claim 1, wherein roller wheels are disposed on an internal top surface of the translation mechanism, auxiliary wheels are disposed on a side surface of the translation mechanism, the roller wheels abutting an upper surface of the guide rail, and the auxiliary wheels abutting a side surface of the guide rail; a sliding contact wire that connects a power supply is disposed on the guide rail, and an electric contact that is electrically connected to the sliding contact wire is disposed within the translation mechanism.

3. The rail-mounted intelligent inspection robot according to claim 1, wherein the intelligent holder comprises a body, an infrared camera module and a visible light camera module that are disposed on both sides of the body, and an insulation measurement module at a bottom of the body, wherein the infrared camera module and the visible light camera module on both sides rotate 90 degrees up and down relative to the body.

4. The rail-mounted intelligent inspection robot according to claim 3, wherein an infrared camera and a pickup unit are disposed on the infrared camera module, and a visible light camera and a fill light are disposed on the visible light camera module; the insulation measurement module comprises an insulation measurement probe, and a ground electric wave sensor and an ultrasonic sensor are disposed on the insulation measurement probe.

5. The rail-mounted intelligent inspection robot according to claim 1, wherein the lifting mechanism further comprises a synchronous pulley connected to the lifting motor, a ball spline shaft and a ball spline sleeve that are matched with each other, a trapezoidal screw and a trapezoidal nut; the synchronous pulley is connected to the lifting motor through a conveyor belt, the synchronous pulley is mounted on the ball spline shaft, and the roller wheels are mounted outside the ball spline sleeve matched with the ball spline shaft; the trapezoidal screw has one end fixedly mounted on the roller wheels, and one other end rotatably cooperated with the trapezoidal nut; and the control module in the control platform controls the lifting motor to operate.

* * * * *